United States Patent
Ito et al.

[11] Patent Number: 5,817,258
[45] Date of Patent: Oct. 6, 1998

[54] METHOD OF INJECTION CONTROL FOR INJECTION MOLDING MACHINE

[75] Inventors: Susumu Ito; Noriaki Neko; Motohiro Nagaya, all of Oshino-mura, Japan

[73] Assignee: Fanuc Ltd., Yamanashi, Japan

[21] Appl. No.: 625,249

[22] Filed: Apr. 1, 1996

Related U.S. Application Data

[63] Continuation of Ser. No. 359,535, Dec. 20, 1994, abandoned.

[30] Foreign Application Priority Data

Dec. 28, 1993 [JP] Japan .................................. 5-349477

[51] Int. Cl.$^6$ .................................................. B29C 47/77
[52] U.S. Cl. ........................ 264/40.1; 264/40.5; 364/476; 425/145; 425/149
[58] Field of Search ............................... 264/40.1, 40.5, 264/328.1; 425/135, 145, 149, 542; 364/476

[56] References Cited

U.S. PATENT DOCUMENTS

| | | | |
|---|---|---|---|
| 4,735,760 | 4/1988 | Kumazaki | 264/40.1 |
| 5,102,587 | 4/1992 | Kumamura et al. | 425/145 |
| 5,154,935 | 10/1992 | Kamiguchi et al. | 425/149 |
| 5,336,073 | 8/1994 | Hiraoka | 425/145 |
| 5,342,559 | 8/1994 | Kamiguchi et al. | 264/40.1 |

FOREIGN PATENT DOCUMENTS

| | | |
|---|---|---|
| 3-58821 | 3/1991 | Japan . |
| 6-122141 | 5/1994 | Japan .................................. 264/40.1 |
| WO 92/11994 | 7/1992 | WIPO . |

OTHER PUBLICATIONS

Patent abstract, Japanese Patent Application 5–192969 dated Aug. 3, 1993.

Patent Abstract, Japanese Patent Application 5–245899 dated Sep. 24, 1993.

*Primary Examiner*—Tim Heitbrink
*Attorney, Agent, or Firm*—Staas & Halsey

[57] ABSTRACT

Over the whole range of the injection process, standard injection speeds and pressures are set and sections for injection speed control and sections for pressure control are set according to the length of time t, screw position S, or injection pressure P, each after the start of injection, or following the combination of the length of time and the screw position or of the length of time and the injection pressure. The arrival at the point of changeover from one control section to another is followed by a control mode shift. If the shift is made for speed control, injection speed is controlled in a manner such that actual injection speed may agree with one standard injection pressure, while if pressure control is selected by the shift, there is provided feedback control which is put into practice so that actual injection pressure may coincide with one standard injection pressure. During the injection process, injection control is effected by speed control or pressure control, whichever is optimal for each of respective sections, whereby stabilized injection molding may be assured.

13 Claims, 6 Drawing Sheets

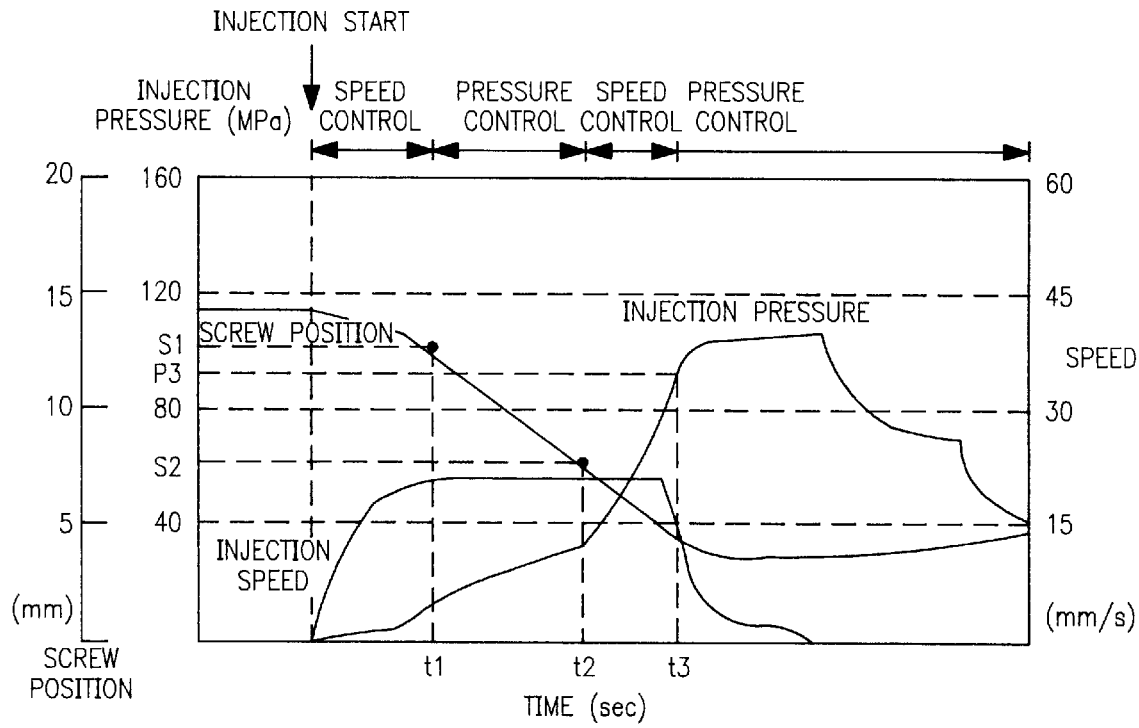

FIG. 4

| j | | | |
|---|---|---|---|
| 1 | SHIFT CONDITION 1 | CURRENT SCREW POSITION Sr ≦ S1 OR CURRENT TIME t ≧ t1 | SPEED CONTROL C0=1 |
| 2 | SHIFT CONDITION 2 | CURRENT SCREW POSITION Sr ≦ S2 CURRENT TIME t ≧ t2 | PRESSURE WAVEFORM CONTROL C1=0 |
| 3 | SHIFT CONDITION 3 | CURRENT INJECTION PRESSURE Pr ≧ P3 OR CURRENT TIME t ≧ t3 | SPEED CONTROL C2=1 |
| | | | PRESSURE WAVEFORM CONTROL C3=0 |
| j | SHIFT CONDITION j | CURRENT ******** OR CURRENT TIME t ≧ tj | Cj=* |
| N | SHIFT CONDITION N | CURRENT ******** OR CURRENT TIME t ≧ tN | CN=* |

FIG. 5

| ADDRESS | TIME | SCREW POSITION | INJECTION PRESSURE | INJECTION SPEED |
|---|---|---|---|---|
| 0 | 0 | S0 | P0 | V0 |
| 1 | T x 1 | S1 | P1 | V1 |
| 2 | T x 2 | S2 | P2 | V2 |
| 3 | T x 3 | S3 | P3 | V3 |
| 4 | T x 4 | S4 | P4 | V4 |
| 5 | T x 5 | S5 | P5 | V5 |
| 6 | T x 6 | S6 | P6 | V6 |
| 7 | T x 7 | S7 | P7 | V7 |
| 8 | T x 8 | S8 | P8 | V8 |
| ⋮ | ⋮ | ⋮ | ⋮ | ⋮ |
| i | T x i | Si | Pi | Vi |
| ⋮ | ⋮ | ⋮ | ⋮ | ⋮ |
| m | T x m | Sm | Pm | Vm |
| ⋮ | ⋮ | ⋮ | ⋮ | ⋮ |

FIG. 6

METHOD OF INJECTION CONTROL FOR INJECTION MOLDING MACHINE

This application is a continuation of application Ser. No. 08/359,535, filed Dec. 20, 1994, now abandoned.

BACKGROUND OF THE INVENTION

1. Field of the Invention

The present invention relates to a method of injection control in the injection process (inclusive of the pressure holding process) of an injection molding machine.

2. Description of the Relevant Art

The injection process of an injection molding machine takes place with injection speed (screw's axial travelling speed) control according to the position of an injection screw, and with injection pressure (pressure of molten plastic within a cylinder; namely, axial pressure applied to a screw) control following the screw position.

In undertaking the former control (injection speed control), the entire screw stroke is first divided into some sections, depending on respective screw positions, and the injection speed for each of the divided sections is temporarily selected, whereby injection control is implemented in a manner that the injection speed temporarily selected as a target for each of the sections may be attained. Where test injection molding which is done subsequently is found failing to provide quality injection molded products, the screw stroke is otherwise divided again and the injection speed originally selected for each of the divided sections is changed to prepare for retest injection molding. In a case where there has been confirmed through repetitive retest injection molding that quality injection molded products are obtainable, the number of sections, and the individual sectional injection speeds thus found effective are designated as respective normal molding conditions.

On the other hand, for the latter control (pressure control), a waveform profile of actual injection pressure monitored in test injection molding with a finding of the availability of quality molded products, is stored in advance, and then, regular injection molding is put into practice with injection pressure controlled in a manner such that actual injection pressure may follow the stored waveform profile (as disclosed in Japanese Patent Application Laid-Open KOKAI 5-192969 and Japanese Patent Application Laid-Open KOKAI 5-245899 for example). Furthermore, a PCT Application Laid-Open as WO92/11994 shows an injection pressure control in accordance with an pressure waveform, in which an operator can modify the waveform, stored in a memory, by displaying it on the screen and using a cursor and functional keys of the display unit.

Another method of injection control which provides mode selectability to choose either speed control or pressure control for the whole sections of the injection process, is also known (as disclosed in Japanese Patent Application Laid-Open KOKAI 3-58821 or its corresponding U.S. Pat. No. 5,154,935 for example).

In the injection process of conventional injection molding, a single cycle of injection occurs with single selectability of either speed control or pressure control as in the foregoing. Therefore, the emergence of some disturbance in speed control gives rise to a large fluctuation of injection pressure midway in control progressing in a manner such that actual injection speed may be brought into an agreement with a setpoint of injection speed. Meanwhile, if the disturbance comes out when pressure control is under way, the injection speed is caused to fluctuate greatly in the course of control which is in progress in a manner such that actual injection pressure may be driven into a coincidence with a setpoint of injection pressure.

Some molded products require that steady injection speed be provided during the injection process (namely, speed control be preferred), and some other products necessitate that stabilized injection pressure be provided while the injection process is going on (namely, pressure control be preferred). Generally, however, which of these control modes is effective for maintainability of stabilized provision of quality molded products, depends sometimes on which section is selected for either one designated mode of control. For some molded products, unless speed control and pressure control are selectively applied in one cycle of the injection process, there may sometimes be failure to provide quality products.

SUMMARY OF THE INVENTION

An object of the present invention is to provide a method of injection control for injection molding, wherein the injection process range is divided into a plurality of sections, for each of which either injection speed control or injection pressure control is then designated, whereby each cycle of injection may go with the designated injection speed and pressure control which are exercised selectively in each of the respective sections.

For dividing the injection process range into a plurality of sections, certain factors such as (1) the position of the injection screw, (2) the pressure of injection and (3) the time elapsed from the start of injection is applied. It is however preferred that the factors of (1) and (3) be applied in combination, wherein a shift be made from one section to another, depending on which setpoint of the factors is first reached in the process of injection or the factors of (2) and (3) be applied in combination, wherein a shift is likewise effected from one section to another according to which setpoint of the sections is first reached.

A shift from an injection pressure control section to a subsequent injection speed control section may sometimes be confronted with the occurrence of a large gap between the actual injection speed at the time the previous section terminates, and the target injection speed at a starting point of the subsequent section. Therefore, the injection speed in a previous pressure control section is measured, and speed control is exercised in a manner as will allow a gradual change from the actual injection speed at the time the previous pressure control section terminates to the target injection speed at the starting point of the succeeding section within a given period. Also in case where a shift is made from one injection speed control section to a succeeding injection pressure control section, pressure control is likewise implemented in a manner as will permit a gradual change from the actual injection pressure at the time the preceding section terminates to the target injection pressure at the starting point of the next section within a given period.

As in the foregoing, according to the present invention, the injection process in each injection molding cycle is provided with respective speed and pressure control sections, whereby for molding one product, injection speed and pressure control may be applied selectively, thus realizing a stabilized injection molding.

BRIEF DESCRIPTION OF THE DRAWINGS

FIG. 4 is a graph with reference data for injection control.

FIG. 5 illustrates a control mode shift condition table entered with certain selected shift conditional particulars for storage in a memory.

FIG. 6 illustrates a reference data table.

DETAILED DESCRIPTION OF THE PREFERRED EMBODIMENTS

Figure 1:
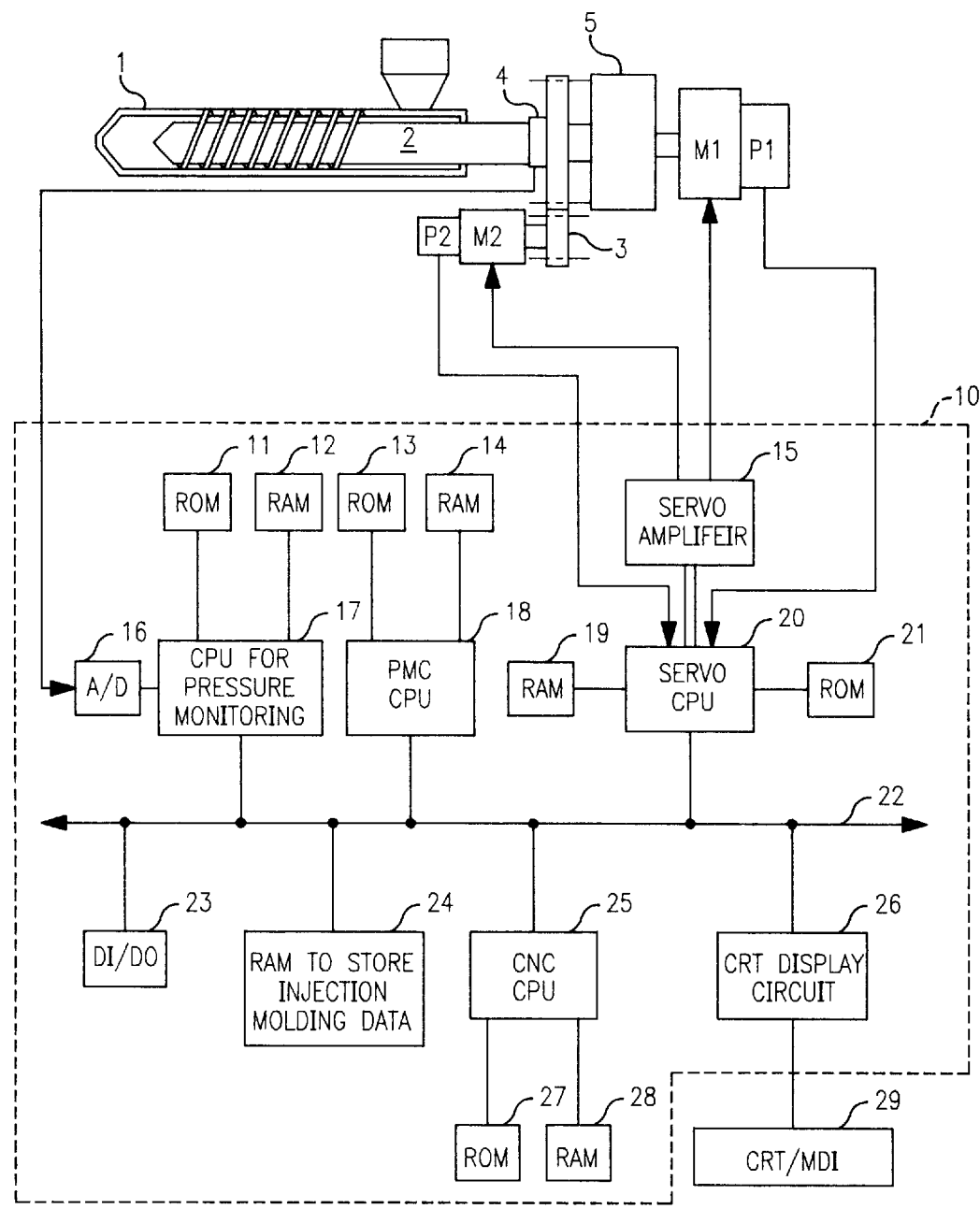
FIG. 1 is a block diagram showing the pivotal parts of an injection molding machine in one embodiment of the present invention.

FIG. 1 is a block diagram showing the pivotal parts of an injection molding machine in one embodiment of the present invention. Reference number 1 corresponds to an injection cylinder of the injection molding machine and reference number 2 to an injection screw. Injection screw 2 is coupled via drive converter 5 to servo motor M1. This drive converter 5 serves to convert the power of rotations from servo motor M1 to the power for linear drive which is then transmitted to injection screw 2, whereby screw 2 travels in an axial direction of injection due to the rotations of servo motor M1 (injection process). Pulse coder P1 mounted to servo motor M1 detects an axial position of screw 2 and a travelling speed thereof. Further, screw 2 is turned by servo motor M2 through gear transmission mechanism 3 (measuring process). Speed sensor P2 is installed to this servo motor M2 to detect a running speed of screw 2.

At a root part of screw 2, there is provided pressure sensor 4 which detects a plastic pressure working in the axial direction of screw 2, namely, the injection pressure in the injection process or a screw back pressure in the process of measuring and kneading.

Control unit 10 of the injection molding machine includes microprocessor 25 (CPU for CNC) for numerical control, microprocessor 18 (CPU for PMC) for a programmable machine controller, microprocessor 20 (servo CPU) for servo control and microprocessor 17 for pressure monitoring to undertake the processing in sampling the injection pressure, hold pressure and screw back pressure by way of A/D converter 16, wherein these microprocessors are mutually connected together via bus 22.

Coupled to CPU 18 for PMC are ROM 13 with a sequence program, etc. stored therein to control sequential run of the injection molding machine, and RAM 14 for use in temporarily storing, etc. of operational data. Further, connected to CPU 25 for CNC are ROM 27 keeping an overall control program, etc. to control the entire run of the injection molding machine, and RAM 28 for use in temporary storage, etc. of operational data. Coupled to servo CPU 20 are ROM 21 with a control program stored therein for exclusive use in servo control, and RAM 19 for temporary storage of data. In the meanwhile, joined to CPU 17 for pressure monitoring are ROM 11 having a control program stored therein which is concerned with the processing, etc. in sampling to monitor injection pressure, screw position and screw travelling speed, and RAM 12 for temporarily storing the data involved.

This servo CPU 20 receives feedback pulses respectively from pulse coder P1 mounted to servo motor M1 and pulse coder P2 installed to servo motor M2. In response to the feedback pulse from pulse coder P1, Servo CPU 20 instructs to store the data of a current position of screw 2 in a present position storage register of RAM 19. Meanwhile, servo CPU 20 outputs a command to servo amplifier 15 to drive each of the servo motors for respective use in mold clamping, ejector manipulation (omitted from being illustrated), injection, screw turning, and so forth. It is noted here that for an injection servo motor and a screw turning servo motor, there are provided respective servo amplifiers, but for the convenience of simplicity in presentation, these servo amplifiers are collectively presented in one block in FIG. 1.

CPU 17 for pressure monitoring receives the data of a detected injection pressure in synchronism with an injection pressure sampling cycle during the injection process. At the same time, said CPU is also fed via CPU 20 with another data of the screw position at the time of sampling, whereby the data respectively of the screw position and the injection pressure corresponding thereto are written into a monitor table provided in RAM 12. Further, written also into this RAM 12 is the data relative to the injection speed at the time of each sampling, which injection speed is figured out from the screw positional variation with the time of each sampling.

FIG. 6 shows the concept of a monitor table which CPU 17 for pressure monitoring prepares within RAM 12. The data of injection pressure Pi (i=0, 1, 2, . . . ) which has been detected by pressure sensor 4 in every sampling cycle $\tau$ after the start (0 time) of injection is written into the table. At the same time, the data of the screw position at the time of each sampling is read through CPU 20, followed by being written into the monitor table as the data of screw position Si. Further, the injection speed at the time of each sampling is calculated from the change in screw position Si over a period from the time of one sampling to that of succeeding sampling and according to cycle time $\tau$ of sampling, with the data of said calculated injection speed then being entered into the monitor table as injection speed Vi. The means to provide this monitor table is identical with that used to be embodied conventionally.

Interface 23 is an input/output interface serving to receive those signals respectively from a limit switch provided at each part of the injection molding machine and an operation panel, and transmit various commands to peripherals of the machine. Display-furnished manual data input device 29 is coupled to bus 22 by way of CRT display circuit 26, whereby it is feasible to optionally select not only each one of display contents on the monitor screen but also designate every one of the functions in a functional menu presented thereon, and input as well as otherwise handle various data. Further, the manual data input device is provided with ten keys for numerical data entry, various function keys, etc.

Non-volatile memory 24 is an injection molding data storage memory in which those molding conditional particulars (injecting conditions, measuring/kneading conditions, etc.) concerned with injection molding, various setpoints, parameters, macro-variables, and so forth are stored. With the present invention, in this memory 24, there is provided a reference table (a table resembling the monitor table presented in FIG. 6) in which respective target injection pressures corresponding to respective times $\tau xi$ (i=0, 1, 2, . . . ) and respective screw positions Si (the respective target injection pressures being due at the times or when each of the respective screw positions is located within an injection pressure control section) or respective target injection speeds likewise corresponding to the respective times and the respective screw positions (the respective target injection speeds being due at the times or when each of the respective screw position is located within an injection speed control section) are entered in advance.

With the above-stated system configuration, CPU 25 for CNC undertakes pulse distribution to the servo motor in each axis according to a control program in ROM 27. On the other hand, following a travel command of the pulse distributed from pulse coder P1 in each axis and those feedback signals respectively of the position and the speed detected by speed sensor P2, etc., servo CPU 20 executes the digital servo processing for servo control such as position loop control, speed loop control, current loop control, etc., likewise in the conventional arts. Particularly, servo CPU 20 serving to drive the injection servo motor executes both injection speed and pressure control, to which reference is made at a later part.

Next, how to prepare the reference table entered with each target injection pressure or speed corresponding to time $\tau \times i$ and screw position Si, and how to select the conditions of a control mode shift between each two sections are described hereunder.

Test injection molding is first started and continued while adjusting molding conditions until quality molded products are available. In this case, it is allowed that injection speed control (hereinafter referred to simply as "speed control") or injection pressure control (hereinafter called simply as "pressure control") is effected over the entirety of the injection process. While test injection molding is under way, the data of the screw position, injection pressure and injection speed actually measured in each sampling cycle, of which data are entered into a monitor table which CPU 17 prepares within RAM 17, are presented in respective graphs on the CRT screen of the manual data input device 29, as shown in FIG. 4.

When it is confirmed through test injection molding that quality molded products are obtainable, the data respectively of the screw position, injection pressure and injection speed actually measured in every sampling cycle, which data have been entered into the monitor table within RAM 12 for storage therein, are written into a reference data table (see FIG. 6) provided within non-volatile memory 24 for storage therein. According to the present invention, injection molding operation is effected, in accordance with data stored in this reference table, as referred to at a later part.

Subsequently, the procedure for setting some injection control sections is started; first using the software keys allocated for control section setting, the reference data which have been loaded in non-volatile memory 24 are displayed in a graph on the CRT screen as shown in FIG. 4. The data of setting each of sequential sections following the start point of injection (namely, setting each point of shifting from one section to another) and those data of selecting either of control modes for each of these sections (namely, selecting either of pressure control or speed control) are input by manipulating the ten keys, a cursor key, etc. of manual data input device 29. In this embodiment of the present invention, a shift between each two control sections is made when either the time of passage from the start of injection or the current screw position reaches its setpoint or instead when either the time of passage after the start of injection or the detected injection pressure arrives at its setpoint.

Here, a description is made of one example of setting injection speed control sections by referring to the display presented on the CRT screen in FIG. 4.

First, the control mode (C0) at the time of injection start is designated as speed control mode (=1). Then, the cursor is moved over to the point of screw position S1, and screw position S1 and passage time t1 after the start of injection, of which passage time corresponds to the screw position, are selected as respective parameters (control mode shift condition 1) for a shift to the next control mode (C1), namely, pressure control (=0). Subsequently, the cursor is moved over to the point of screw position S2, and screw position S2 and passage time t2 corresponding thereto are selected as respective parameters (control mode shift condition 2) for a shift to the succeeding control mode (C2), namely, speed control (=1).

Further, the cursor is moved to the point of injection pressure P3, and injection pressure P3 and passage time t3 after the start of injection, of which passage time corresponds to the injection pressure, are selected as respective parameters (control mode shift condition 3) for a shift to the next control mode (C3), namely, pressure control (=0).

When designating the respective control modes and selecting these parameters defining the points of respective shifts are over, the designated control modes and the selected parameters are entered into a control mode shift condition table for storage therein, which is prepared in non-volatile memory 24 (see FIG. 5).

Figure 7:
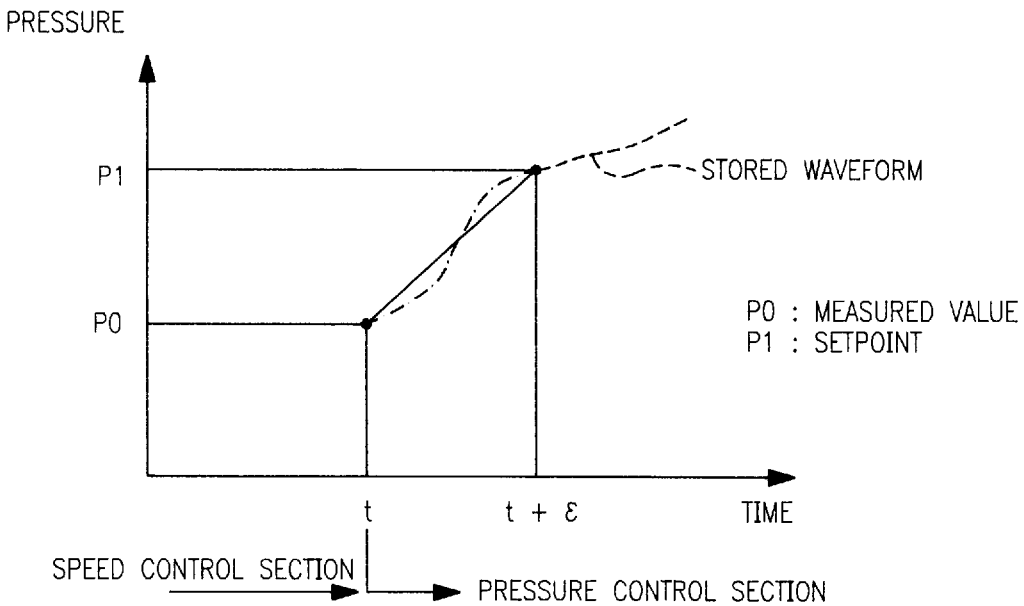
FIG. 7 is a graph illustrating one example of the processing for a control mode shift from speed control to pressure control in the injection process.

Further, referring to FIG. 7, how to cope with the occurrence of a gap between actual injection pressure at the time a shift is effected from speed control to pressure control and the target pressure at the time when pressure control is started, is described. Moreover, using FIG. 8, a description is made of how to deal with a gap emerging between actual injection speed at the time a shift is effected from pressure control to speed control and the target speed at the time when speed control is set about.

The abscissa of the coordinates of a graph in FIG. 7 stands for the time of passage from the start of injection while the ordinate denotes the magnitude of injection pressure. Noting this figure, it is found that speed control is exercised up to the time t of passage, with the injection pressure monitored which is going on up to said time, and also P0 detected as actual injection pressure at the time t of passage. On the other hand, it is also found that the target injection pressure at time (t+$\epsilon$) of passage as much as a given length ($\epsilon$) from time (t) of a control mode shift (namely, the value of injection pressure stored in non-volatile memory 24 as a reference data and which takes at the time t+$\epsilon$ of passage) is made, is P1. Therefore, in undertaking pressure control after time t, a segment (a straight line given in a solid line or a curve in a dotted line) running through a point (t, P0) and a point (t+$\epsilon$, P1) is taken as a reference pressure waveform profile extending from time t to time t+$\epsilon$, and the control is effected in a manner such that injection pressure may follow said waveform profile.

Figure 8:
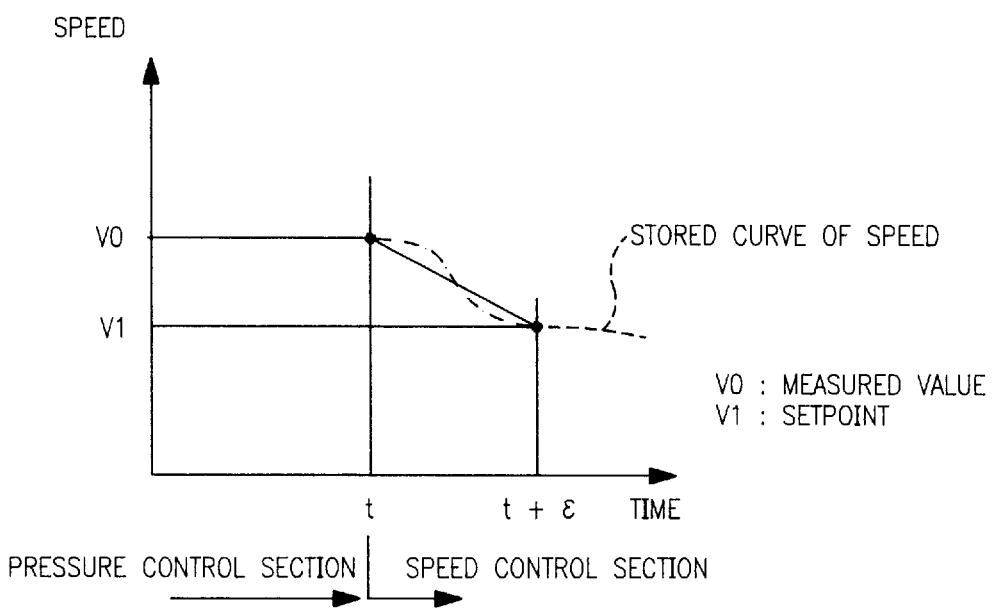
FIG. 8 is a graph illustrating another example of the processing for a control mode shift from pressure control to speed control.

In the meanwhile, the abscissa of the coordinates of a graph in FIG. 8 shows the time of passage from the start of injection and the ordinate the magnitude of injection speed. Referring to this figure, it is clarified that pressure control is continued up to time t of passage, and the injection speed prevailing during this period is monitored, with V0 detected as actual injection speed at time t. On the other hand, the target injection speed at time (t+$\epsilon$) of passage as much as a given length ($\epsilon$) from the point (time t) of a control mode shift (namely, the value of injection speed stored in non-volatile memory 24 as a reference data and which takes at the time t+$\epsilon$ of passage) is V1. Accordingly, in assuming speed control after time t, a segment (a straight line given in a solid line or a curve in a dotted line) running through a point (t, V0) and a point (t+ε, V1) is taken as a target speed straight line or curve which extends from time t to time t+ε, and control is effected in a manner such that injection speed may follow said straight line or curve.

Figure 2:
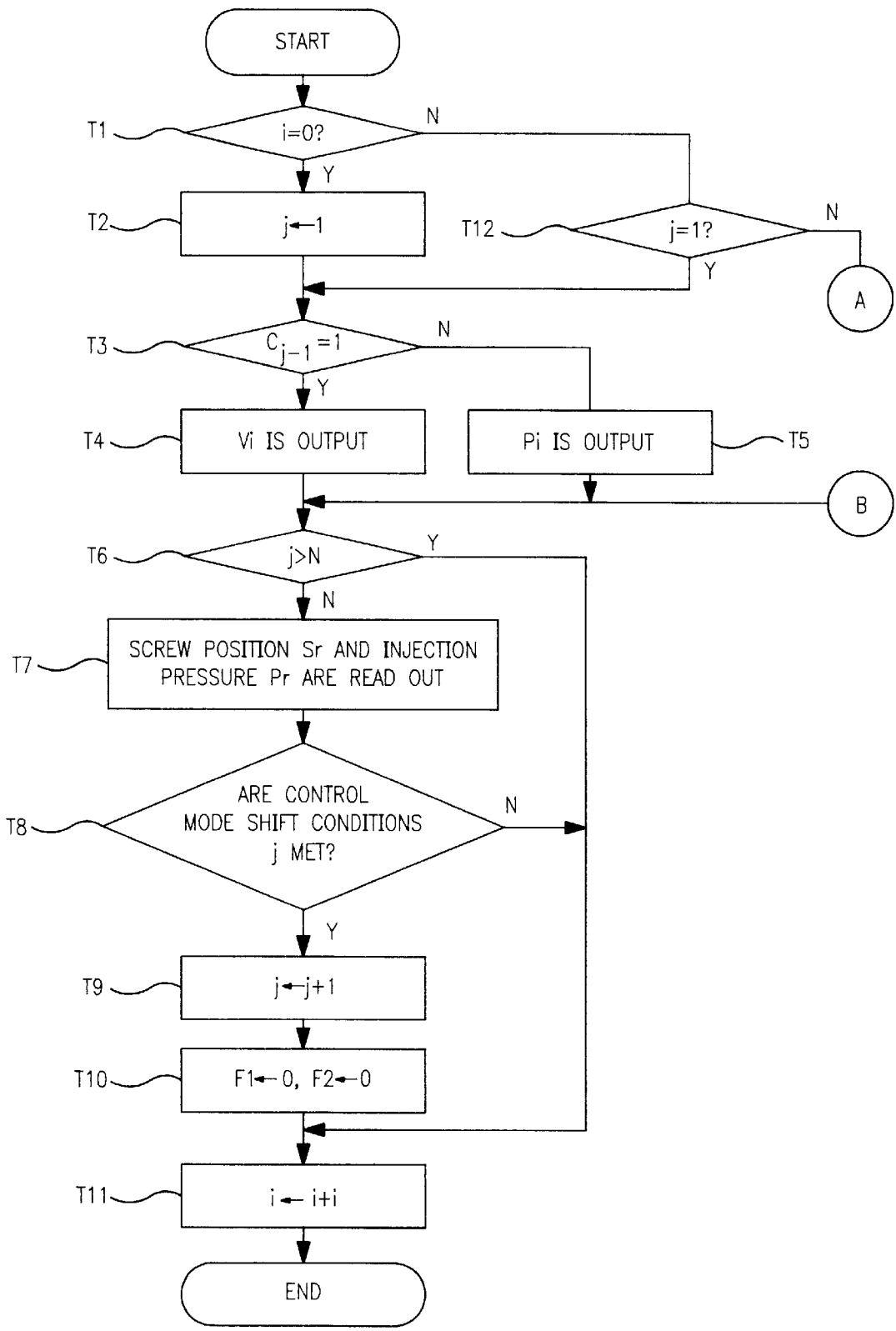
FIG. 2 is a part of the flowchart illustrating the control mode shift-related serial processing in one embodiment of the present invention.
Figure 3:
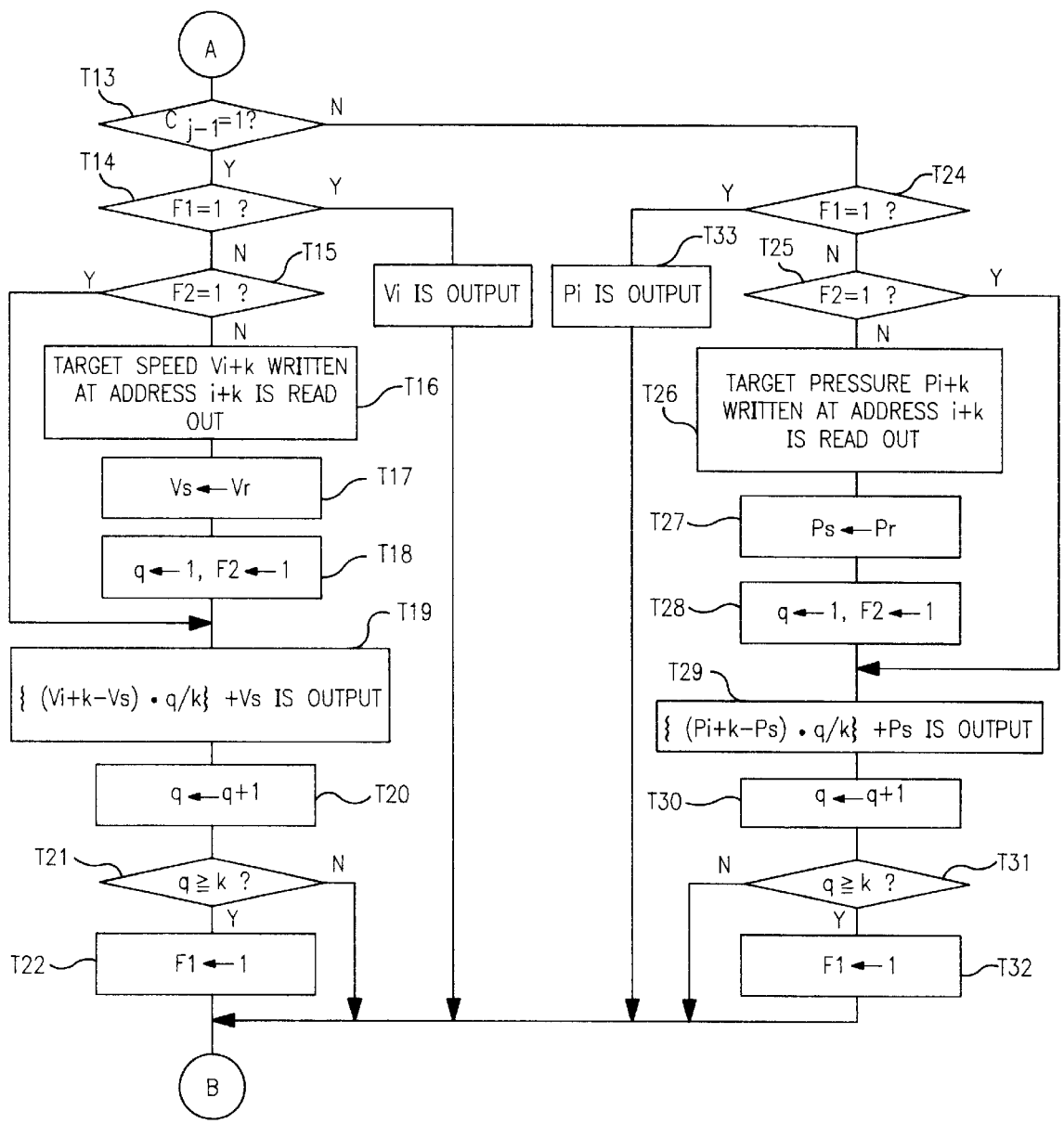
FIG. 3 is a continuation of the flowchart presented in FIG. 2.

Next, with reference to FIGS. 2 and 3, a description of how CPU 18 for PMC undertakes the processing in every cycle τ of sampling when the injection molding machine is started, running into the stage of the injection process upon selecting the target injection pressure and the target screw speed corresponding to passage time/screw position as shown in FIG. 6, and setting each of the respective parameters for a shift to select either of the control modes, as shown in FIG. 5.

First, whether or not index i is "0" is examined (step T1). This index is set to "0" every time one cycle of the injection process is over, and the initial sampling cycle immediately after the start of injection concurs with index i remaining at "0". When said index i is found "0", index j giving the address where the control mode shift condition table is kept, is set to "1"(step T2), and control mode Cj−1=C0 specified by address (j−1) of said control mode shift condition table is read out, with whether or not index j is set to "1" being examined (step T3). If found set to "1", it is signified that an injection speed control section has been selected; therefore, target speed Vi (=V0) stored at an address given by index i (=0) in the reference data table presented in FIG. 6 is read out and is subsequently outputted to CPU 25 for CNC as a command of speed. When fed with this command of speed, CPU 25 for CNC, following said command, undertakes the distribution of a travel command pulse to an injection servo motor, whereby servo CPU 20 is fed with this command pulse, executing each of position, speed and electric current loop processing, similarly to the conventional arts, with the travelling speed of the injection servo motor, namely, the speed of injection being controlled.

Meanwhile, when recognizing control mode Cj−1 to be set "0", which means a pressure control section selected in step T3, then target injection pressure Pi (=P0) stored at the address given by index i (=0) in the reference data table is read out, and said target injection pressure Pi is then outputted to servo CPU 20 as a command of pressure (step T5). Servo CPU 20 implements servo control so that the pressure Pr detected by such pressure sensor 4 may agree with target injection pressure Pi, as disclosed in Japanese Patent Application Laid-Open KOKAI, 3-58821. In this connection, the pressure Pr from the pressure sensor 4 is detected by the servo CPU 20 via A/D converter 16 and pressure monitoring CPU 17. But the output Pr of the pressure sensor 4 may be inputted to servo CPU 20 through a A/D converter.

Next, whether or not index j exceeds control mode shift number N written in the control mode shift condition table is examined (step T6), and if found not exceeding said number N, screw position Sr and injection speed Vr currently confirmed (those data stored at the address given by index i and which are prevailing at time i×τ of passage from the start of injection ) are read out from the monitor table kept within RAM 12 of pressure monitor CPU 17 (step T7). Where there takes place a delay with CPU 17 in preparing the monitor table in RAM 12, it is allowed to apply such a system configuration that CPU 18 for PMC reads out screw position Sr from a current position storage register within RAM 19, and injection pressure Pr from A/D converter 16 through CPU 20 and pressure monitor CPU 17, and then calculates the injection speed from said read screw position Sr and the screw position previously read in the preceding cycle of sampling.

Next, whether or not one of screw position Sr, injection pressure Pr or time i×τ of passage meets the control mode shift conditions specified by index j is examined (step T8). To be more precise by referring to the control mode shift condition table in FIG. 5, whether or not screw position Sr is yet to reach setpoint S1 at the time of j=1, or whether current time t has arrived at setpoint ti or not (namely whether or not index i exceeds the value selected as shift condition 1) is examined. If any one item of the shift condition is found meeting the above condition, there takes place an advance to step T9 on the assumption that from the succeeding cycle of sampling, a control mode shift is due. However, when confirmed failing to said condition, a changeover is made to step T11, with index i given an increment of "1" and the processing for this sampling cycle is terminated.

The next cycle of sampling takes place with an advance from step T1 to step T12, and whether or not index j is "1" is examined; as this case goes with j=1, each of the procedures prescribed above for the individual steps following step T3 is executed. Thereafter, in each cycle of sampling, each of said procedures is carried into practice, wherein if one of control mode shift conditions j selected at step T8 is met, there occurs an advance from step T8 to step T9 and index j is given an increment of 1, with flags F1 and F2 being set to "0" (steps T9 and T10), while index i is given an increment of "1", with the procedure prescribed for said each cycle of sampling being terminated.

The succeeding cycle of sampling takes place with a changeover from step T12 to step T13, since index j is set to "2", and whether or not control mode shift condition Cj−1 (=C1) corresponding to index (j−1) which is written in the control mode shift condition table is "1" is examined, wherein if confirmed as being "1", a further changeover is made to step T14 on the assumption that pressure control is under way while if found as being "0", a changeover is effected to step T24 on another assumption that pressure control is progressing. In the example presented in FIG. 5, control mode shift condition Cj−1 (=C1) is designated to "0", whereby in response thereto, a control mode shift to pressure control is determined and therefore, there occurs an advance to step T24, with whether or not flag F1 is "1" and whether or not flag F2 is "1" being examined (step T25), wherein flags F1 and F2 being set respectively to "0" at step T10, there goes an advance to step T26, whereat from the reference data table, target pressure Pi+k stored at the address (i+k) given by a sum from adding a setpoint of k which has been selected for index i to the above index i is read out (T26). The setpoint of k is a value obtained by dividing ε by cycle time τ, namely, setpoint k is expressed as k=ε/τ. Further, current injection pressure Pr is read out, which is then set as initial value Ps for pressure control (T27).

Then, coefficient q is set to "1" and further, flag F2 is also set to "1" (step T28).

And the value obtained by subtracting Ps, which has been selected as an initial value, from read target pressure Pi+k is multiplied by coefficient q, and also divided by the setpoint of k followed by adding, to this value, initial value Ps selected in step T27, is outputted a command of pressure to servo CPU 20 (step T29). Next, "1" is added to coefficient q (step T30) and then, whether or not said coefficient q exceeds setpoint k is examined (step T31), wherein if found not exceeding setpoint k, there occurs a backward changeover to step T6, with the respective procedures for those steps following said step T6 being executed subsequently.

In the next cycle of sampling, there occurs a serial changeover to respective steps T1, T12, T13 and T24, and step T25 takes place with examining whether flag F2 has been set to "1" or not. Meanwhile, said flag F2 having been set to "1" in step T28 whereat the procedure for the preceding cycle of sampling was executed, a changeover is effected from step T25 to step T29, whereby the respective procedures for those steps following said step T29 are then executed. Thereafter, said procedures are repetitively executed; however, when coefficient q is found exceeding a setpoint of k in step T31, flag F1 is set to "1" (step T32), with a backward changeover being effected to step T6, whereby in the next cycle of sampling, there occurs a changeover from step T24 to step T33, and from the reference data table, target pressure Pi stored at the address given by index i is read out, which is then outputted as a command of pressure, with the procedure prescribed for step T6 being executed subsequently. From the succeeding cycle of sampling, the procedures prescribed respectively for steps T1, T12, T13, T24, T33 and those following step T6 are executed.

The above-mentioned procedures for step 25 through step T32 are devised to prevent an abrupt change of pressure at the time a shift is made from speed control to pressure control. Within each speed control section, no pressure control is effected and therefore, actual injection pressure is not maintained at a target injection pressure therein, whereby it is conceivable that at the time when a shift is made to pressure control, there may possibly exist a large gap between actual injection pressure and the target pressure. In such a case, since a sudden change of pressure is not desired, with this in view, the present invention is devised, whereby over a selected period (k×τ), there may be provided a gradual change from actual injection pressure at the time a control mode shift is effected, to the target injection pressure. This embodiment of the present invention is devised to be of such a system configuration wherein a linear change is allowed to take place over a selected period (k×τ) by executing the above-mentioned respective procedures. Namely, (Pi+k−Ps)/k is an amount of change, over period τ of one sampling cycle, from actual injection pressure Pr=Ps prevailing at the time of a control mode shift is made, to target injection pressure Pi+k at the time of passage as much as (k×τ) after the shift. It is, therefore, feasible that multiplying this amount of change by the number of sampling cycles as coefficient q, followed by adding the value of injection pressure Ps at the time when a control mode shift is made, to the product of said multiplication serves to provide a command of pressure for every sampling cycle for a linear change from the injection pressure at the time the control mode shift is made, to a target value which is given by a target pressure waveform profile.

And after the elapse of time (k×τ) from the point at which a control mode shift is effected, a command of pressure is outputted which is based on the target pressure waveform profile comprising those reference data which have been set by executing the procedure for step T33.

In case where, in the course of repeatedly executing the procedures prescribed respectively for steps T1, T12, T13, T24, T33 and those following step T6, any one item of the control mode shift conditions given by index j (=2) is met in step T8, namely, wherein at the time screw position Sr is found below setpoint Sj (=S2) of control mode shift condition j (=2) or when the current time t reaches tj (=t2), the procedures respectively for steps T9 and T10 are executed, and index j is given an increment of "1" (j=3), with flags F1 and F2 being set to "0" respectively. As a result, in the process of executing the procedures involved in the succeeding cycle of sampling, whether control mode shift condition Cj−1 (=C2), according to which either of the control modes is stored in step T13, is "1" or not is examined, and the example quoted in FIG. 5 takes place with C2=1, whereby on the assumption that a shift is due to be made to speed control, a changeover is made from step T13 to step T14. The procedures prescribed for steps T14 through T23 are similar to those for steps T24 through T33, the latter serving to provide a command of pressure while the former rendering service for providing a command of speed, but the procedural particulars of both are totally identical, excepting their concerns about pressure P and speed V. In view of this, a detailed description is omitted. Namely, also in the case with said steps, to avoid an abrupt change of injection speed at the time of making a control mode shift, a command of speed is varied in a manner such that there may be provided a linear change, over a period of (k×τ), from the injection speed going on at the time a control mode shift is effected, to such a speed as given by the target injection speed waveform profile, and also that there may be outputted a command of injection speed based on the injection speed waveform profile, which is stored as a reference data, when a period of (k×τ) expires.

Further when any one item of control mode shift condition j (=3) given by index j is met in step T8 while speed control is under way, said index j is given an increment of 1(j=4), with flags F1 and F2 being set to "0", respectively, and the next cycle of sampling starts with a control mode shift from one to the other. In the case of the example shown in FIG. 5, if detected injection pressure Pr exceeds injection pressure P3 or when current time t goes beyond a setpoint of time t3, which has been selected as control mode shift condition j (=3), there goes an advance to step T9, and index j is given an increment to j=4. The result is that the next cycle of sampling takes place with the procedures respectively for steps T1 and T12 being executed, and subsequently in step T13 upon an advance thereto, the value selected for Cj−1=C2 is read out, wherein since the selected value is "0", a changeover is effected from step T13 to step T24 whereat a command of pressure for the above-remarked pressure control is then outputted.

Thus, as long as sequential control mode shift conditions are set, a shift is effected serially from injection speed control to injection pressure control or vice versa when the control mode shift conditions are met, whereby the injection process may be controlled. Further when the value of index j exceeds N, the selected number of control mode shifts (when index j becomes 4, in the example of FIG. 4, since N=3), a changeover is made from step T6 to step T11, with the control whose mode has been selected for the last section, being exercised until the end of the injection process without examination of a shift condition.

As in the foregoing, a alternative shift is effected between selected injection speed control and injection pressure control in the injection process.

In the above-described embodiment of the present invention, commonly in injection pressure control and injection speed control, the waveform profiles respectively of injection speeds and injection pressures monitored during the injection process that brought forth quality molded products are designated as standard waveform profiles, wherein injection speed and pressure are controlled so that they will follow the profiles of respective standard waveforms. However, it is also allowable that either one or both of those waveform profiles of injection pressures and injection speed may be a set speed waveform profile or a set pressure waveform profiles, not monitored waveform profiles. Further, in the above embodiment of the present invention, a control mode shift concurs with adjusting each of respective commands of pressure and speed in a manner such that the actual injection pressure or speed at the time of making the shift may change linearly toward a target pressure or speed within a set period of time. It is however allowed that instead of linearly changing actual injection pressure or speed, control may be effected in a manner such that the amount of change in pressure or speed is gradually increased immediately after the start of a control mode shift up to a first intermediate time point, then is kept constant up to a second intermediate time point, and is gradually decreased from the second intermediate time point to the termination point of the control mode shift.

As described above, with the present invention, it is allowed that injection control is effected by either speed control or pressure control which is optionally selected for each of individual sections into which the injection process has been divided. Therefore, according to the present invention, it is practicable that the injection process is divided into a plurality of sections, for each of which an optimal mode of control is optionally effected so that there will be provided quality molded products. As a consequence, in addition to the feasibility of stabilized injection molding and the availability of quality molded products therefrom, molds, etc. are safeguarded against excessive load, whereby molds and so forth may be assured of freedom from suffering damage, and their service lives may be elongated.

What is claimed is:

1. A method of injection control mode shift management for injection molding machines, comprising the steps of:

dividing an entire range of an injection molding process into a plurality of injection speed and pressure control sections including at least one injection speed control section and at least one injection pressure control section;

selecting a desired order of said at least one injection speed control section and said at least one injection pressure control section in said entire range of the injection molding process, for each of said at least one injection speed control section, selecting a target injection speed, for each of said at least one injection pressure control section, selecting a target injection pressure;

in each of said at least one injection speed control section, controlling an actual injection speed to equal said selected target injection speed;

in each of said at least one injection pressure control section, controlling an actual injection pressure of the injection molding process to equal said selected target injection pressure; and setting control section shifting conditions for shifting from one of an injection speed control section and an injection pressure control section;

continuing the injection molding process in said one control section while determining whether the control section shifting conditions set by said setting step are met;

shifting from said one control section to the other control section when the control section shifting conditions set by said setting step are met, and then continuing the injection molding process; and repeating said setting and continuing steps.

2. The method of injection control mode shift management for injection molding machines as claimed in claim 1, further comprising the steps of:

monitoring and storing the actual injection speeds and pressures provided over the entire range of the injection molding process;

setting the stored injection speeds and pressures as respective target injection speeds and pressures;

displaying the target injection speeds and target injection pressures; and dividing said injection speed control sections and injection pressure control sections by referring to said displayed target injection speeds and pressures.

3. The method of injection control mode shift management for injection molding machines as claimed in claim 1, further comprising the step of selecting a point where a control mode shift is made between each of said injection speed control sections and each of said injection pressure control sections based on any one of a time elapsed from a start of injection, a screw position reached thereafter, or an injection pressure attained thereafter.

4. The method of injection control mode shift management for injection molding machines as claimed in claim 1, further comprising the steps of:

selecting a point where a control mode shift is effected between each of said injection speed control sections and each of said injection pressure control sections based on a pair of parameters—one being a time elapsed from a start of injection and the other being a screw position corresponding to said time, or based on another pair of parameters—one being a time elapsed after a start of injection and the other being an injection pressure corresponding to said time effecting the control mode shift when any one parameter of said pair of selected parameters attains its set point for control mode shift.

5. The method of injection control mode shift management for injection molding machines as claimed in claim 1, further comprising the step of, at a point where a control mode shift is effected, performing an advance calculation of a target injection pressure or speed in a manner such that within a given set time, a gradual change may take place from a current injection pressure to the selected target injection pressure due after the expiration of said given set time or from a current injection speed to the selected target injection speed due after the passage of said given set time.

6. A method of injection control mode shift management for injection molding machines, in which an injection molding process range includes at least one section where injection speed is controlled and one section where injection pressure is controlled, comprising the steps of:

(a) obtaining reference data for a plurality of sections of the injection molding process regarding a position of an injection screw, an injection pressures and a screw speed which will bring forth quality molded products;

(b) designating either a speed control mode or a pressure control mode for each corresponding said at least one injection speed section and said at least one injection pressure section, and practicing said speed control mode in a manner such that an actual injection speed agrees with a target injection speed, and practicing said pressure control mode in a manner such that an actual injection pressure agrees with a target injection pressure;

(c) setting control mode shift conditions for switching over from one of the control modes designated in step (b) to the other control mode midway in the injection molding process; and (d) continuing the injection molding process with the control mode other than that designated in step (b) after the control mode shift conditions set in step (c) are met.

7. The method of injection control mode shift management for injection molding machines as claimed in claim 6, wherein said control mode shift conditions comprise two different factors, respectively, of the position of the injection screw and an elapsed time from the start of injection, and wherein either the arrival at a selected injection screw position or the passage of a selected time after the start of injection along with the progress of the injection molding process is judged as fulfilling said control mode shift conditions.

8. The method of injection control mode shift management for injection molding machines as claimed in claim 6, wherein said control mode shift conditions comprise two different factors, respectively, of the injection pressure and an elapsed time from the start of injection and wherein either the arrival at a selected injection pressure or the passage of a selected time after the start of injection along with the progress of the injection molding process is judged as fulfilling said control mode shift conditions.

9. The method of injection control mode shift management for injection molding machines as claimed in claim 6, further comprising the step of determining said control mode shift conditions by selectively designating a first shift condition or a second shift condition, said first shift condition comprising two different factors, respectively, of the position of the injection screw and an elapsed time from the start of injection, wherein said control mode shift conditions are met when either the selected position of an injection screw or the selected time of passage after the start of injection is reached as the injection molding process progresses, and said second shift condition comprising two different factors, respectively, of the injection pressure and the elapsed time from the start of injection, wherein said control mode shift conditions are met when either the selected injection pressure or the selected time of passage after the start of injection is reached.

10. The method of injection control mode shift management as claimed in claim 6, wherein during the injection molding process with speed control under way, the injection pressure is measured, and subsequently when a changeover is effected from a speed control section to a pressure control section, pressure control is exercised over a period from the time of said changeover to an elapsed time therefrom as much as a given length in a manner such that the first target pressure at the time of change over is decided from the injection pressure measured at that time, and the second target pressure at the time after said given length of elapsed time is decided from the injection pressure in said reference data of that time, and then pressure is controlled so as to agree with a straight line or curved line connecting said first and second target pressures.

11. The method of injection control mode shift management for injection molding machines as claimed in claim 6, wherein during the injection molding process with pressure control in progress, the injection pressure is measured and subsequently when a changeover is effected from a pressure control section to a speed control section, speed control is exercised over a period from the time of said changeover to an elapsed time therefrom as much as a given length in a manner such that the first target speed at the time of changeover is decided from the injection speed measured at that time, and the second target speed at the time after said given length of time elapsed is decided from the injection speed in said reference data of that time, and then speed is controlled so as to agree with a straight line or curve line connecting said first and second target speeds.

12. A method of injection control mode shift management, comprising the steps of:

(a) obtaining reference data for injection pressure and screw speed for a plurality of sections of an injection molding process;

(b) designating, either a speed control mode or a pressure control mode for each section, and practicing said speed control mode such that an actual injection speed agrees with a target injection speed, and practicing said pressure control mode such that an actual injection pressure agrees with a target injection pressure;

(c) setting control mode shift conditions for switching over from one of the control modes designated in step (b) to the other control mode midway in the injection molding process; and (d) continuing the injection molding process with a control mode other than the control mode designated in step (b), after the control mode shift conditions set in step (c) are met, wherein during the injection molding process with speed control under way, the injection pressure prevailing at that time is measured, and subsequently when a changeover is effected from a speed control section to a pressure control section, pressure control is exercised over a period from the time of said changeover to an elapsed time therefrom as much as a given length of elapsed time in a manner such that the first target pressure at the time of change over is decided from the injection pressure measured at that time, and the second target pressure at the time after said given length of elapsed time is decided from the injection pressure in said reference data of that time, and then pressure is controlled so as to agree with a straight line or curved line connecting said first and second target pressures.

13. A method of injection control mode shift management, comprising the steps of:

(a) obtaining reference data for injection pressure and screw speed for a plurality of sections of an injection molding process;

(b) designating, either a speed control mode or a pressure control mode for each section, and practicing said speed control mode such that an actual injection speed agrees with a target injection speed, and practicing said pressure control mode such that an actual injection pressure agrees with a target injection pressure;

(c) setting control mode shift conditions for switching over from one of the control modes designated in step (b) to the other control mode midway in the injection molding process; and (d) continuing the injection molding process with the control mode other than the control mode designated in step (b), after the control mode shift conditions set in step (c) are met, wherein during the injection molding process with pressure control in progress, the injection pressure prevailing at that time is measured and subsequently when a changeover is effected from a pressure control section to a speed control section, speed control is exercised over a period from the time of said changeover to an elapsed time therefrom as much as a given length of elapsed time in a manner such that the first target speed at the time of changeover is decided from the injection speed measured at that time, and the second target speed at the time after said given length of elapsed time is decided from the injection speed in said reference data of that time, and then speed is controlled so as to agree with a straight line or curve line connecting said first and second target speeds.

* * * * *